United States Patent Office 3,790,444
Patented Feb. 5, 1974

3,790,444
PROCESS FOR PREPARING DIKETOGLUCONIC ACID
Shunichiro Oga, Kiyoshi Sato, Katsumi Imada, and Kazuo Asano, Osaka, Japan, assignors to Daiichi Seiyaku Co., Ltd., Tokyo, Japan
No Drawing. Filed Mar. 9, 1972, Ser. No. 233,293
Claims priority, application Japan, Mar. 9, 1971, 46/12,643
Int. Cl. C12b 1/00
U.S. Cl. 195—47      6 Claims

ABSTRACT OF THE DISCLOSURE 2,5-diketogluconic acid is produced in a high yield by the cultivation of newly isolated *Acetobacter fragum* n. sp.

BACKGROUND OF THE INVENTION

Field of the invention

This invention relates to a process for producing 2,5-diketogluconic acid (hereinafter referred to as 2,5-KG), and more particularly to a process for producing 2,5-KG by fermentation using the new strain *Acetobacter fragum* n. sp.

Description of the prior art 2,5-KG is a useful intermediate in the production of commenic acid and as a precursor of vitamin C. Heretofore, 2,5-KG has been produced from several different varieties of microorganism. For example, 2,5-KG has been produced by cultivation of *Acetobacter melanogenum*, *Acetobacter aurantium*, *Gluconobacter rubiginosus*, *Gluconoacetobacter liquiefaciens*, *Pseudomonas sesami* and the like. The use of these microorganisms, however, is not completely desirable from an industrial point of view. For instance, most of these microorganisms produce large amounts of brown or yellowish-brown pigments as byproducts of cultivation, thereby decreasing the purity of the resulting 2,5-KG. Complicated purification procedures are required and even then the yield of product is quite low and the fermentation time required is extensive. For example, using the aforementioned conventional microorganisms, a fermentation time of 50 to 60 hours is required to obtain a suitable yield. Moreover, the cultivation requires the expensive use of organic nitrogen sources, such as peptone or meat extract, in addition to inorganic ammonium salts.

A need exists, therefore, for an industrially useful microorganism for preparing 2,5-KG.

SUMMARY OF THE INVENTION

Accordingly, one object of the present invention is to provide an economical process for preparing 2,5-KG by the use of a microorganism which will accumulate said compound in the culture broth at a yield as high as 85–87% (calculated from glucose).

Another object of this invention is to produce 2,5-KG in an industrially acceptable manner using a microorganism which permits high yields at relatively rapid cultivation periods.

Still another object of this invention is to provide 2,5-KG by a cultivation method which results in a relatively high purity product.

These and other objects, as will hereinafter be further understood, have been attained by the cultivation of *Acetobacter fragum* n. sp., ATCC #21409.

DETAILED DESCRIPTION OF PREFERRED EMBODIMENTS

*Acetobacter fragum* n. sp. has been deposited in the American Type Culture Collection, Rockville, Md., and has been assigned ATCC #21409. It is a microorganism which has been isolated from strawberries.

The advantages of using this microorganism for the production of 2,5-KG are numerous. For one, cultivation does not result in the production of noxious pigments, yet good yields of 2,5-KG can be produced in relatively short periods of time. The cultivation process does not require the use of expensive nitrogen sources and good results are attainable with the use of ammonium sulfate and glucose (2.5–20% w./v.).

The morphology pigmentation and biology of the new microorganism were attained according to the classification method recommended by Bergy's "Manual of Determinative Bacteriology" (7th Edition), and the results are described hereinafter.

The strain:

1 is an ordinary sized Bacillus and possesses a motility;
2 does not require a pigment for photosynthesis;
3 is not adhesive to the culture medium;
4 cannot utilize ammonium salts, nitrates, methane, hydrogen, carbon monoxide, sulfur or its homologous (heterotrophic); (insofar as submitting to the test conditions indicated in the Bergy's method)
5 actively oxidizes various saccharides to form acids, though gas production is not recognized on the assimilation of them; and,
6 can oxidize ethanol to acetic acid.

From the results of from No. 1 to No. 5, this strain must belong to the genus Pseudomonas, Xanthomonas or Acetobacter in the family of Pseudomonadaceae in accordance with the above-mentioned Bergy's classfiication method. However, from the point of No. 6, the inventors decided that it belongs to the Acetobacter genus.

Further details in taxonomic studies have been done in accordance with "Manual of Microbiological Method," McGraw-Hill Book Co., Inc., 1957. The results are described below.

(A) The properties revealed in culture mediums.
Medium No. 1:
  Boillon agar
  Vegetative: moderate, grayish-white, translucent, surface glossy.
  Colony: round, entirely smooth in the surrounding surface.
  Pigment production: yellowish-brown in or out of mycelium (small amount)
Medium No. 2:
  Glucose-yeast extract agar (glucose 2%, yeast extract 1%, peptone 0.5%, $CaCO_3$ 1%, agar 1.5%; at pH 6.4, 30° C.)
  Vegetative: grayish, translucent, surface glassy (gradually dissolves $CaCO_3$);

(B) Microscopic morphology.—Mycelium cultivated on mannit-yeast extract agar medium for 18 hours at 30° C. reveals the following characteristics:

size: $0.8 \times 1.2 – 3\mu$
shape: round at the edge (sometimes long)
production of spore: none Remarks.—Stain:
gram negative
motilitive when stab-cultured in mannit-yeast extract agar medium (semi-solid).

(C) The optimum conditions for the growth in glucose-yeast extract agar medium.
The strain grows and multiplies within the temperature range of 10–37° C., preferably 20–30° C. (fairly at 10° C., and hardly at 37° C.). The most preferable pH range for growth is between 5 and 6.5, but even at pH 4, sufficient growth occurs. On the other hand, the stab-cultured in ordinary Boillon-agar medium will grow only on a surface of agar and along the stab-culture line.

(D) Physiological properties:
(a) growth in Hoyer medium: negative
(b) cultivation in ethanol medium containing ammonium sulfate and peptone or yeast extract: converts ethanol into acetic acid
(c) liquification of gelatin medium: not observed
(d) ability of hydrolyzing starch: negative
(e) acid formation in Litmas-milk medium: positive
(f) activity of coagulation of Litmas-milk medium: negative
(g) activity of clarification of Litmas-milk medium: negative
(h) reduction of nitrates: strongly positive
(i) fermentation of $H_2S$: negative
(j) ability of producing indole: negative
(k) Nessler's test: negative
(l) Methyl red test: negative
(m) catalase activity: weakly positive
(n) activity of decomposing urea: weakly positive
(o) alkalification of the medium containing sodium acetate, sodium lactate or sodium succinate: positive
(p) growth in the Simon medium containing citrates or glutamates: slightly positive
(q) requirement of nicotinic acid: essential
(r) utility of saccharide: The utility of various kinds of saccharides were examined by cultivating the micro-organisms in peptone water containing each 1% of the saccharides and by checking the color formation of the culture with BTB.

The results are as follows: maltose, glucose, mannose, galactose, fructose, xylose, L-arabinose, mannit and glycerine are utilizable; starch, dextrine, inuline, saccharose, lactose, sorbose, rammose, sorbit, inositol, zulsit and salcyin are not utilizable; (gas production is not observed in all cases).

When collating these properties to those of the Acetobacter genus, classified according to Bergy's manual, it is assumed that the strain would belong to one of the species, *Acetobacter pasteurianus, Acetobacter rancens, Acetobacter kuetzingianus* from the following reasons about characteristics: the strain does not grow in a Hoyer medium, produces no soluble pigment and cellose membrane in a fluid culture medium, and it has the ability to decompose acetic acid.

However, the present strain differs from these known species in the following characteristics as shown in Table 1 below.

TABLE 1

| Characteristic | Aceto-bacter rancens | Aceto-bacter pasteurianus | Aceto-bacter kuetzingianus | The present strain |
|---|---|---|---|---|
| Formation of viscous thin membrane in liquid yeast extract medium. | + | | | − |
| Essential requirement of: | | | | |
| Pantothenic acid | + | | | − |
| p-Aminobenzoic acid | + | | | − |
| Thiamine | + | | | − |
| Acid formation from: | | | | |
| Sorbit | + | | | − |
| Arabinose | − | | − | + |
| Fructose | − | | − | + |
| Galactose | − | | − | + |
| Maltose | − | | | + |
| Glycerine | − | | − | + |
| Vegetative at 42° C | ++ | + | | − |

From the above, it is surmised that the present microorganism does not belong to any of the conventional species.

Furthermore, this microorganism also differs, in some properties, from known microorganisms producing 2,5-KG, e.g., *Acetobacter melanogenum*, (A) *Acetobacter aurantium*, (B) *Gluconobacter rubiginosus*, (C) *Gluconoacetobacter liquifaciens*, (D) and *Pseudomonas sesami* n. sp. (E) the differences are listed in the following Table 2.

TABLE 2

| Characteristic | (A) | (B) | (C) | (D) | (E) | Present strain |
|---|---|---|---|---|---|---|
| Production of brown or yellowish-brown pigment | +++ | +++ | +++ | +++ | +++ | − |
| Essential requirement of: | | | | | | |
| Pantothenic acid | + | | | | | − |
| p-Amino benzoic acid | + | | | | | − |
| Thiamine | + | | | | | − |
| Utilization of: | | | | | | |
| Sucrose | | | + | | | − |
| Citrate | | | − | | | + |
| Acidification of medium containing acetates or lactose | + | | | + | | − |
| Acid formation in: | | | | | | |
| Litmas milk medium | − | | − | | | + |
| Maltose medium | | | − | | | + |
| Sucrose medium | | | + | | | − |
| Lactose medium | | | | | + | − |
| Salycin medium | | | | | + | − |
| Lamnose medium | | | | | + | − |
| Liquification of gelatine | | | + | | | − |
| Oxidation of ethanol to AcOH | | | − | | | + |
| Growth in Simon's medium containing succinate | | | | | − | + |
| Formation of $H_2S$ | | | | | + | − |
| Methyl red test | | | | | + | − |

As mentioned above, there is no known species corresponding to the present strain in accordance with Bergy's classification methods and the strain has not been described in any other reports. From the above, it has been concluded that the present strain belongs to a new species, hereinafter designated as *Acetobacter fragum* n. sp.

According to the present invention, cultivation for producing 2,5-KG may be carried out as follows: *Acetobacter fragum* n. sp. is cultured in a medium of which the main material is glucose. The present microorganism does not require expensive organic nitrogen sources such as peptone or meat extract, if an inorganic ammonium salt, for example, ammonium sulfate, ammonium nitrate, ammonium carbonate, is contained in the medium. However, nicotinic acid should be essentially contained as the vitamin. Inoculum for the main culture medium should range from 1–10% (v./v.) per fermentation liquor. The glucose concentration in the medium varies between 2.5 and 20%, preferably between 10 and 12% in order to obtain 2,5-KG most economically. The fermentation temperature is between 20° and 35° C., preferably between 25° and 30° C., most preferably around 27° C. The accumulation of 2,5-KG is accomplished usually over a period of 25 to 48 hours.

The initial pH of the culture may be preferably adjusted to between 4.0 and 5.8 with $CaCO_3$, $SrCO_3$ or alkali metal hydroxide, and care must be taken to keep the pH at the same range during the fermentation. When cultivation is complete, the culture broth is filtered with a filter aid, for example, diatomaceous earth, to obtain an aqueous filtrate which may be used in the production of comenic acid. The resultant 2,5-KG may be recovered by any conventional procedure. For example, the pH of the filtrate is adjusted to 2.0 to 2.6 with mineral acid and concentrated to about one-fifth volume at below 50° C. Then, 5 to 6 times volume of methanol or ethanol is added to the concentrate and the solution is left to stand in order to precipitate 2,5-KG (calcium salt or alkali metal salt).

As mentioned above, according to the method in this invention, 2,5-KG may be produced in a good yield by cultivating a newly isolated microorganism for a short period of time in a medium containing glucose at high concentrations and which does not contain a highly expensive nitrogen source. Furthermore, according to the method of this invention, complicated purification procedures, such as deprotein process, can be eliminated.

Quantitative and qualitative determination methods concerning 2,5-KG have been difficult. The present inventors, however, have solved the problem of finding both the carbonyl group of 2,5-KG reacting with hydrazine quantitatively to give 3-hydroxymethyl-4-oxo-1,4-dihydropyridazine-6-carboxylic acid.

Having now generally described the invention, a further understanding can be obtained by reference to the following specific examples which are provided herein for purposes of illustration only and are not intended to be limiting in any manner unless otherwise specified.

EXAMPLE 1

An aqueous culture medium (1,000 ml.) was prepared containing the following ingredients:

| | G. |
|---|---|
| Glucose | 25 |
| Corn steep liquor | 5 |
| $KH_2PO_4$ | 0.5 |
| $K_2HPO_4$ | 0.5 |
| $MgSO_4 \cdot 7H_2O$ | 0.2 |
| $CaCO_3$ | 6.3 |

About 10 ml. of this medium was placed into a test tube and sterilized for 15 minutes at 121° C. Then, to this test tube, one loopful of culture (*Acetobacter fragum* n.sp.) primarily fermented in agar-slant medium for 2 or 3 days, was inoculated, and fermented without agitation for 3 days at 30° C. The culture was added to another 100 ml. of fresh aqueous culture medium taken in a Sakaguchi flask of 500 ml. capacity and fermented with agitation for 16 hours. The resulting culture was used as the seed culture.

Production of 2,5-KG

An aqueous production culture medium was prepared containing:

| | | |
|---|---|---|
| Glucose | kg | 2.4 |
| $(NH_4)_2SO_4$ | g | 20 |
| $KH_2PO_4$ | g | 10 |
| $K_2HPO_4$ | g | 10 |
| $MgSO_4 \cdot 7H_2O$ | g | 4.0 |
| NaCl | g | 0.2 |
| $MnSO_4 \cdot 7H_2O$ | g | 0.2 |
| $FeSO_4 \cdot 7H_2O$ | g | 0.2 |
| Nicotinic amido | mg | 8 |
| Calcium pantothenate | mg | 8 |
| p-Amino benzoic acid | mg | 8 |
| Water | liters | 16 |

After sterilizing the culture medium with steam for 15 minutes at 121° C., the medium was placed in a Jar-fermenter of 30 liter capacity. To the medium was added 0.66 kg. of $CaCO_3$ and 2 liters of the above mentioned seed culture. Then, the total volume of the culture was adjusted to 20 liters (initial pH: 5.8). The cultivation was carried out at a temperature of 30° C. under submerged conditions (agitation frequency: 300 r.p.m.; air introduction: 8 liter/min.). The accumulation of 2,5-KG was checked through the fermentation by color reaction on paper chromatogram (with 1% of p-anisidine·HCl solution in butanol).

It was found that the glucose in the medium was consumed after 32 hours and 2,5-KG was accumulated.

The fermentation liquor was mixed with 70 g. of diatomaceous earth and, filtered to give an aqueous solution containing 2,5-KG. After filterization, the filtrate was adjusted to a pH of 2.6 with hydrochloric acid and concentrated to about 3 liters at 35° C. to 40° C. About 1.0 liter of methanol was added to the concentrate, and the resulting precipitate was removed by filtration.

The filtrate was added to 28 liters of cooled methanol, while stirring. The mixed solution was allowed to stand overnight to precipitate white to yellow crystals. The crystals were collected by filtration and dried in a desiccator ($P_2O_5$) to give 2.56 kg. of white yellow powder. About 0.8 kg. of secondary crystals were additionally obtained from concentration of the mother liquor. The yield of 2,5-KG produced in the fermentation medium was determined according to the following method:

About 100 ml. of the filtrate which was obtained by the filtration of the fermentation liquor was concentrated in vacuo to 40 ml. at a pH of below 4.0 and below 50° C. To the concentrated solution, 40 ml. of pyridine and 20 ml. of acetic acid were dissolved and then 5.4 ml. of 80% hydrazine hydrate was added dropwise. The reaction mixture was allowed to stand at 5° C. for 3 days. The resulting crystal was filtered, washed with water and dissolved in hot water. To the filtrate was added 66.5 ml. of N-sulfuric acid and the resulting calcium sulfate was removed by filtration. The filtrate was concentrated to give 10.70 g. of 3 - hydroxymethyl-4-oxo-1,4-dihydropyridazine-6-carboxylic acid monohydrate having a melting point of 204.5° C. as white needle crystals.

From the yield, it is recognized that 130.5 g. of calcium 2,5-diketogluconate $(C_6H_7O_7)_2 \cdot 2H_2O$ was obtained in the 100 ml. of fermentation liquor. Therefore, the yield of 2,5-KG from glucose was determined as 87%.

EXAMPLES 2–4

In repetition of analogous experiments, the results obtained according to the same method as above are shown in the following table:

| Example number | Amount of glucose used as material | Fermentation time | Yield o 2,5-KG (percent) |
|---|---|---|---|
| 2 | 1.0 (kg./20 liters) | 24 | 87.0 |
| 3 | 2.0 (kg./20 liters) | 26 | 87.0 |
| 4 | 3.0 (kg./20 liters) | 45 | 85.0 |

Having now fully described the invention, it will be apparent to one of ordinary skill in the art that many changes and modifications can be made thereto without departing from the spirit or scope of the invention as described herein.

Accordingly, what is claimed as new and desired to be covered by Letters Patent is:

1. A process for producing 2,5-diketogluconic acid which comprises cultivating *Acetobacter fragum* n. sp. ATCC No. 21409 in a glucose medium and then recovering the resulting 2,5-diketogluconic acid or its salt from the fermentation liquor.

2. The process according to claim 1, in which the concentration of glucose is from 5 to 15% (w./v.).

3. The process according to claim 1, in which the cultivation is conducted at a temperature of 25° to 30° C.

4. The process according to claim 1, in which the cultivation is conducted at a pH of between 4.8 and 5.8.

5. The process according to claim 1, in which the cultivation is conducted in a medium containing inorganic ammonium salt as a nitrogen source.

6. The process according to claim 1, in which the cultivation is conducted at a pH of between 4.8 and 5.8 and at a temperature of 25° to 30° C., in a medium containing glucose, at a concentration of 5 to 15% (w./v.), and using an inorganic ammonium salt as a nitrogen source.

References Cited

Whistler et al.: Methods in Carbohydrate Chemistry, Academic Press 1963, vol. II, pp. 51–56.

A. LOUIS MONACELL, Primary Examiner

T. G. WISEMAN, Assistant Examiner

U.S. Cl. X.R.

195—31 R